(12) United States Patent
Urano et al.

(10) Patent No.: US 10,058,960 B2
(45) Date of Patent: Aug. 28, 2018

(54) CAULKING METHOD

(71) Applicant: TOYOTA JIDOSHA KABUSHIKI KAISHA, Toyota-shi (JP)

(72) Inventors: Hiroaki Urano, Miyoshi (JP); Koji Yamada, Okazaki (JP); Masahiko Matsuda, Okazaki (JP); Mitsuhiro Ide, Anjo (JP); Masayuki Ikemoto, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 187 days.

(21) Appl. No.: 15/081,274

(22) Filed: Mar. 25, 2016

(65) Prior Publication Data

US 2016/0296992 A1 Oct. 13, 2016

(30) Foreign Application Priority Data

Apr. 7, 2015 (JP) .................................. 2015-078276

(51) Int. Cl.
*B21D 39/04* (2006.01)
*B23P 11/00* (2006.01)

(52) U.S. Cl.
CPC .................................. *B23P 11/005* (2013.01)

(58) Field of Classification Search
CPC ...... B23P 11/005; B21J 15/022; B21J 15/046; B21J 15/06; B21J 15/10; B21J 15/14; B21J 15/26; B21J 15/00

See application file for complete search history.

(56) References Cited

FOREIGN PATENT DOCUMENTS

| CN | 101549380 A | 10/2009 |
| CN | 101992253 A * | 3/2011 |
| JP | 2-99233 | 4/1990 |
| JP | 2004-188427 | 7/2004 |
| JP | 2010-264480 | 11/2010 |
| JP | 2011-73049 | 4/2011 |
| JP | 5192830 | 2/2013 |

OTHER PUBLICATIONS

English translation of CN101992253A.*

* cited by examiner

*Primary Examiner* — Jun Yoo
(74) *Attorney, Agent, or Firm* — Oblon, McClelland, Maier & Neustadt, L.L.P.

(57) ABSTRACT

A caulking method includes: determining a caulking depth which becomes equal to or larger than a necessary release torque that has been set in advance, determining a stroke amount of a push-in part which becomes equal to or larger than the caulking depth that has been determined; determining the stroke amount of a drive unit which becomes equal to or larger than the stroke amount of the push-in part that has been determined, and controlling the drive unit at a target control stroke amount that is equal to or larger than the stroke amount of the drive unit that has been determined but is smaller than the stroke amount of the drive unit at which the caulk part is damaged.

1 Claim, 8 Drawing Sheets

CAULKING METHOD

INCORPORATION BY REFERENCE

This application is based upon and claims the benefit of priority from Japanese patent application No. 2015-78276, filed on Apr. 7, 2015, the disclosure of which is incorporated herein in its entirety by reference.

BACKGROUND OF THE INVENTION

1. Field of the Invention

The present invention relates to a caulking method and relates to, for example, a caulking method that strokes a push-in part by a drive unit of a caulking device to caulk-fix a caulk part of a first member to be caulked to a second member to be caulked.

2. Description of Related Art

A typical caulking device strokes a push-in part by a drive unit to caulk-fix a caulk part of a first member to be caulked to a second member to be caulked. At this time, a stroke amount of the push-in part is measured using a sensor and the measured amount is fed back to determine a target control stroke amount of the drive unit.

For example, a caulking device disclosed in Japanese Unexamined Patent Application Publication No. 2010-264480 also measures a stroke amount of a caulk roller using a sensor and feedback-controls a drive unit to stroke the caulk roller in a stroke amount smaller than the stroke amount where a distortion occurs in a bearing.

However, in the caulking device disclosed in Japanese Unexamined Patent Application Publication No. 2010-264480, the sensor to measure the stroke amount of the caulk roller needs to be provided, which increases a cost of the caulking device. Further, the caulking device disclosed in Japanese Unexamined Patent Application Publication No. 2010-264480 performs feedback control based on the measured amount of the stroke amount, which increases the operation amount and leads to an increase in a processing load and an increase in a processing time.

SUMMARY OF THE INVENTION

The present invention has been made in view of the above background. The present invention suppresses an increase in a processing load and an increase in a processing time and achieves caulk fixing for a low cost.

A caulking method according to one aspect of the present invention is a caulking method that strokes a push-in part by a drive unit of a caulking device to caulk-fix a caulk part of a first member to be caulked to a second member to be caulked, the method including the processes of:

determining, when torque necessary for releasing a state in which the caulk part is caulk-fixed to the second member to be caulked is denoted by a necessary release torque and an amount of displacement in a stroke direction of the push-in part in the caulk part from a state before the caulk part is caulk-fixed to the second member to be caulked to a state after the caulk part is caulk-fixed to the second member to be caulked is denoted by a caulking depth, the caulking depth which becomes equal to or larger than the necessary release torque that has been set in advance based on a relation between the necessary release torque that has been set in advance and the caulking depth, determining a stroke amount of the push-in part which becomes equal to or larger than the caulking depth that has been determined based on a relation between the caulking depth that has been set in advance and the stroke amount of the push-in part;

determining the stroke amount of the drive unit which becomes equal to or larger than the stroke amount of the push-in part that has been determined based on the relation between the stroke amount of the push-in part that has been set in advance and the stroke amount of the drive unit; and controlling the drive unit at a target control stroke amount that is equal to or larger than the stroke amount of the drive unit that has been determined but is smaller than the stroke amount of the drive unit that has been set in advance at which the caulk part is damaged.

According to the present invention, it is possible to suppress an increase in a processing load and an increase in a processing time and to achieve caulk fixing for a low cost.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

A caulking method according to an embodiment will be described. First, a configuration of a caulking device used for the caulking method according to this embodiment will be described.

Figure 1:
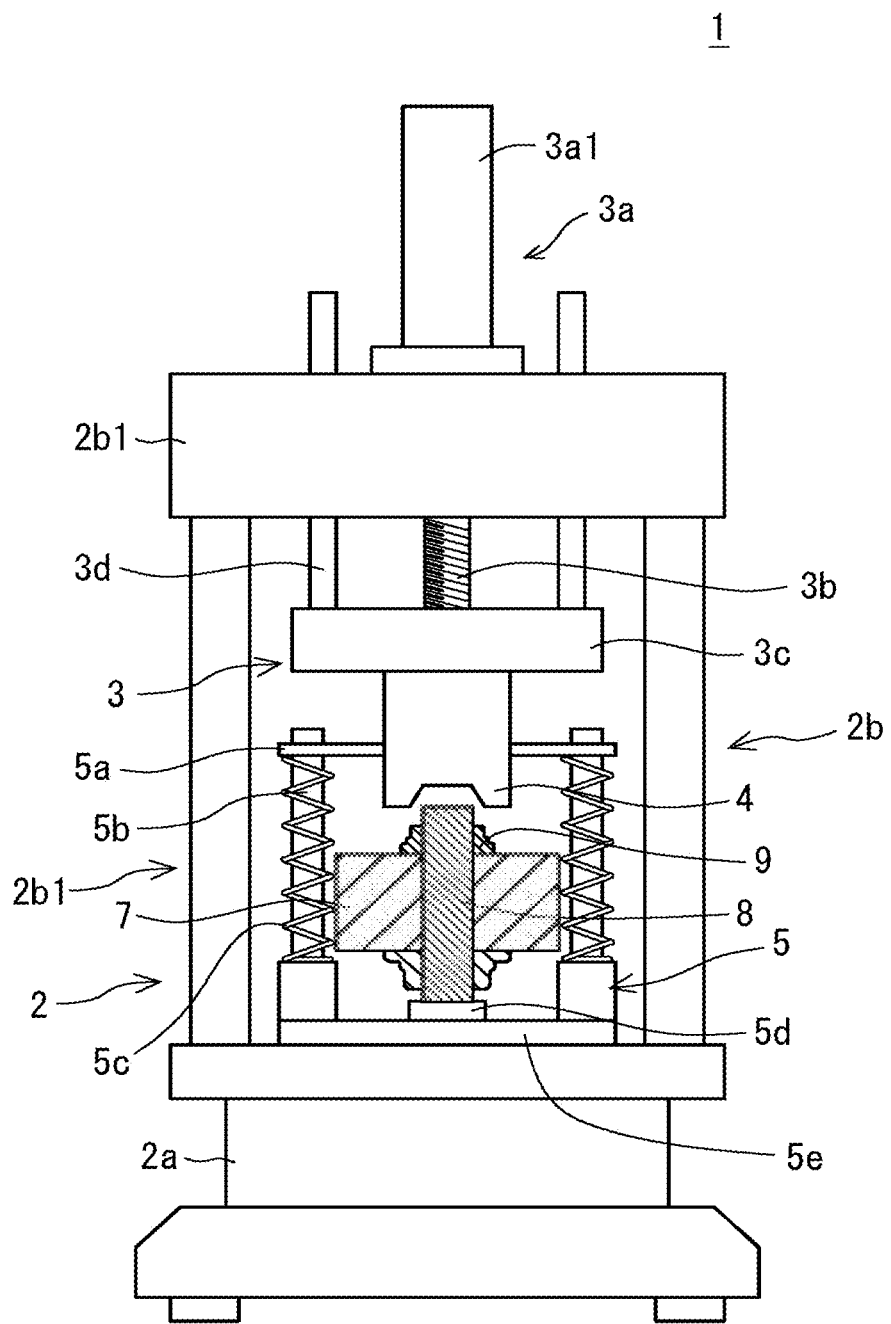
FIG. 1 is a front view of the caulking device according to the embodiment showing a partial cross-sectional view of a state in which a nut is caulk-fixed to a shaft.
Figure 2:
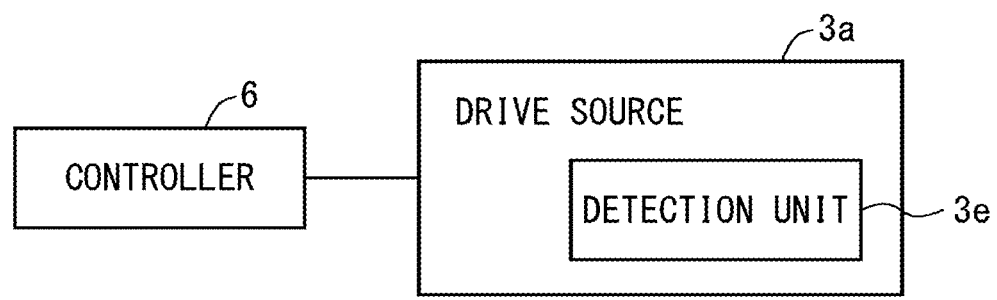
FIG. 2 is a block diagram showing a control system of the caulking device according to the embodiment.
Figure 3:
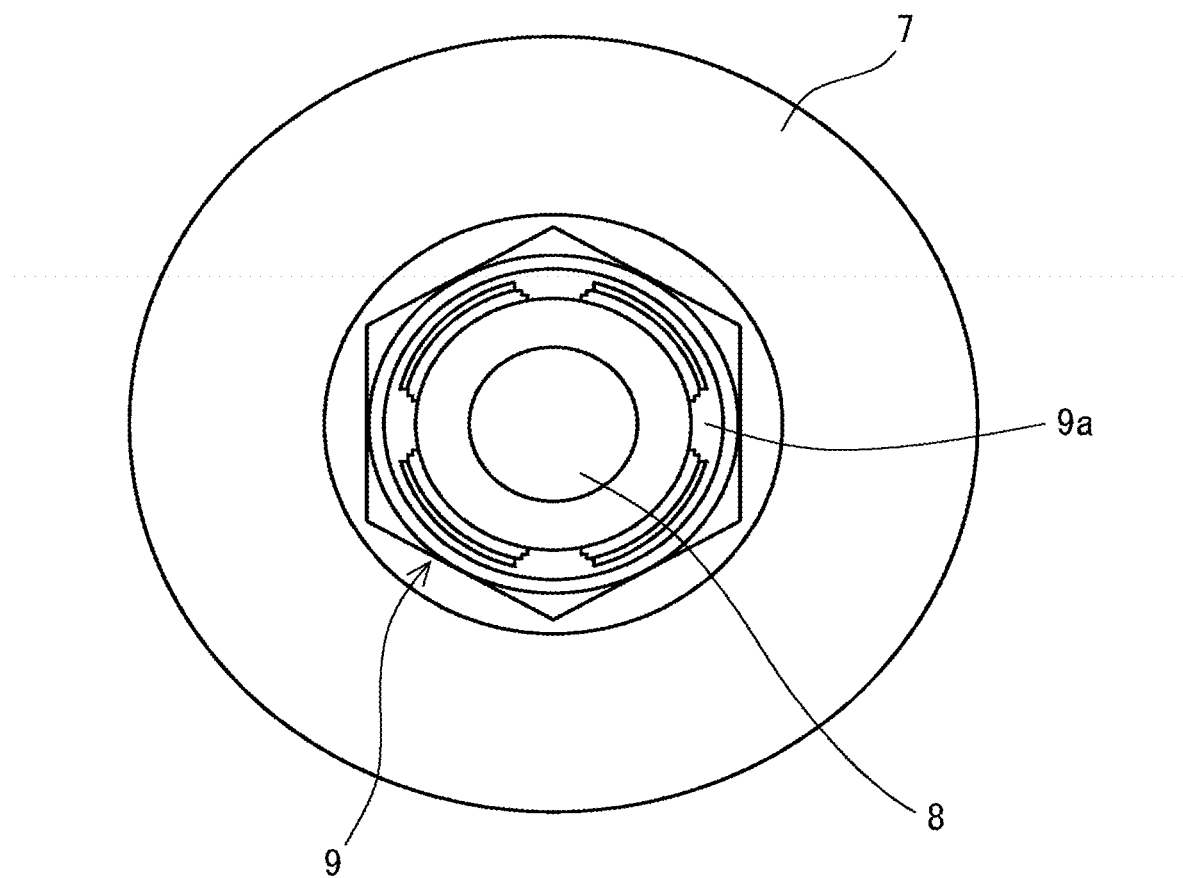
FIG. 3 is a plan view showing a state in which the nut is caulk-fixed to the shaft.
Figure 4:
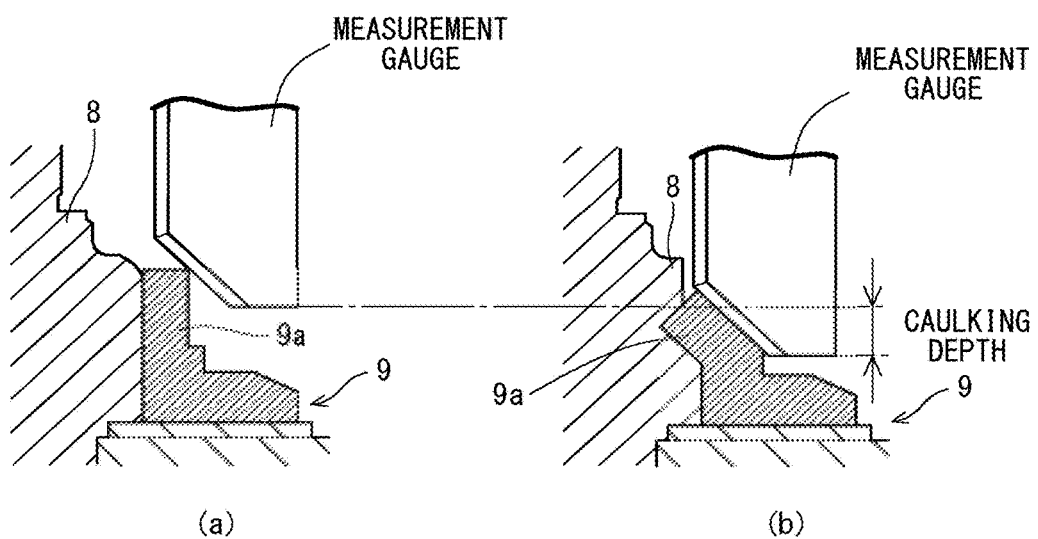
FIG. 4 is a diagram for describing a caulking depth of a caulk part, (a) shows a state before the caulk part is caulk-fixed, and (b) shows a state after the caulk part is caulk-fixed.

FIG. 1 is a front view of the caulking device according to the embodiment showing a partial cross-sectional view of a state in which a nut is caulk-fixed to a shaft. FIG. 2 is a block diagram showing a control system of the caulking device according to this embodiment. FIG. 3 is a plan view showing a state in which the nut is caulk-fixed to the shaft. FIG. 4 is a diagram for describing a caulking depth of the caulk part. FIG. 4(*a*) shows a state before the caulk part is caulk-fixed and FIG. 4(*b*) shows a state after the caulk part is caulk-fixed. In the following description, the vertical direction and the lateral direction of the caulking device are defined based on the embodiment shown in FIG. 1.

A caulking device 1 according to this embodiment includes, as shown in FIGS. 1 and 2, a frame part 2, a drive unit 3, a push-in part 4, a caulking jig 5, and a controller 6. The frame part 2 includes a base part 2a and an arch part 2b. In this embodiment, the upper surface of the base part 2a is a flat surface and the arch part 2b is supported on this flat surface.

The drive unit 3 strokes (displaces) the push-in part 4 in the vertical direction of the caulking device 1. The drive unit 3 according to this embodiment includes a drive source 3a, a screw axis 3b, a contact part 3c, and a guide 3d.

The drive source 3a is a servo motor and includes, as shown in FIG. 2, a detection part (e.g., an encoder) 3e that detects a rotation angle of an output shaft. The output shaft of the drive source 3a protrudes to the lower side of the caulking device 1 from a housing 3a1 of the drive source 3a and is inserted into a penetration part (not shown) formed in a beam part 2b1 of the arch part 2b. The housing 3a1 of the drive source 3a is fixed to the beam part 2b1 of the arch part 2b. While the servo motor is used as the drive source 3a in this embodiment, a motor generally used can be used as the drive source 3a.

The screw axis 3b extends in the vertical direction of the caulking device 1 and is inserted into the penetration part (not shown) formed in the beam part 2b1 of the arch part 2b. The upper end part of the screw axis 3b is coupled to the output shaft of the drive source 3a so as to be able to transmit the drive force of the drive source 3a. In this embodiment, the upper end part of the screw axis 3b is fixed to the lower end part of the output shaft of the drive source 3a so that the rotation axes of them substantially overlap each other.

The contact part 3c transmits the drive force of the drive source 3a to the push-in part 4. In this embodiment, the lower end part of the screw axis 3b is rotatably coupled to the upper surface of the contact part 3c. The lower surface of the contact part 3c is formed into a flat surface.

The guide 3d is a rod that guides the contact part 3c in the vertical direction of the caulking device 1. In this embodiment, a plurality of guides 3d extend in the vertical direction of the caulking device 1 and each of the guides 3d is passed through the penetration part (not shown) formed in the beam part 2b1 of the arch part 2b. The lower end part of the guide 3d is fixed to the upper surface of the contact part 3c. These guides 3d are arranged with point symmetry about a center of the screw axis 3b, for example, when seen from the vertical direction of the caulking device 1.

The push-in part 4 is a punch to push a caulk part of a first member to be caulked and fold the caulk part to caulk-fix it to a second member to be caulked. As shown in FIG. 1, the push-in part 4 in this embodiment is screwed into a shaft 8, which is the second member to be caulked and is passed through a rotor core 7, to hold the shaft 8 from the upper and lower directions, and caulk-fix a nut 9, which is the first member to be caulked that fixes the shaft 8 to the rotor core 7, to the shaft 8. Specifically, as shown in FIG. 3, the caulk part 9a that is raised from the end surface on the side opposite to the direction in which the nut 9 is screwed into the shaft 8 is folded to the side of the shaft 8 and is cut into the shaft 8 to prevent the nut 9 from being loosened. While the first member to be caulked is the nut 9 and the second member to be caulked is the shaft 8 in this embodiment, the first member to be caulked and the second member to be caulked are not particularly limited as long as the caulk part can be caulk-fixed to the second member to be caulked by pushing the caulk part of the first member to be caulked.

The upper surface of the push-in part 4 is a flat surface and contacts the lower surface of the contact part 3c. At this time, the push-in part 4 is arranged in such a way that the central axis of the screw axis 3b and the central of the push-in part 4 substantially overlap each other when seen from the vertical direction of the caulking device 1.

The caulking jig 5 supports the rotor core 7 and the shaft 8 fixed by the nut 9 and guides the push-in part 4 in the vertical direction of the caulking device 1. The caulking jig 5 according to this embodiment includes an arm part 5a, a guide 5b, an elastic body 5c, a support part 5d, and a base part 5e. The arm part 5a protrudes in the lateral direction of the caulking device 1 from the push-in part 4.

The guide 5b is a rod that guides the push-in part 4 in the vertical direction of the caulking device 1. In this embodiment, a plurality of guides 5b are raised from the upper surface of the base part 5e and extend in the vertical direction of the caulking device 1. The guide 5b is passed through a penetration part (not shown) formed in the tip end part of the arm part 5a. The guides 5b are arranged to surround the rotor core 7 and the shaft 8 fixed by the nut 9 and arranged with point symmetry about a center of the screw axis 3b, for example, when seen from the vertical direction of the caulking device 1.

The elastic body 5c raises the push-in part 4 which has finished the operation of pushing the caulk part 9a to an original position (height position where the contact part 3c and the push-in part 4 are in a substantially non-contacting state). The elastic body 5c according to this embodiment is a coil spring and the guide 5b passes through the elastic body 5c. The elastic body 5c is arranged between the arm part 5a and the base part 5e. While the coil spring is used as the elastic body 5c in this embodiment, a typical elastic body such as a plate spring may be used.

The support part 5d supports the rotor core 7 and the shaft 8 fixed by the nut 9 from the lower side. The support part 5d according to this embodiment includes a concave part (not shown) in which the lower end part of the shaft 8 is inserted and is fixed to the upper surface of the base part 5e. The support part 5d is arranged in such a way that, when the lower end part of the shaft 8 is inserted into the concave part and the rotor core 7 and the shaft 8 fixed by the nut 9 are supported by the support part 5d, the central axis of the screw axis 3b and the central axis of the shaft 8 substantially overlap each other when the caulking device 1 is seen from the vertical direction.

The base part 5e is a plate-like member and is fixed to the upper surface of the base part 2a in the frame part 2. The caulking jig 5 is exchanged integrally with the push-in part 4 according to the member to be caulk-fixed or the shape of the caulk part.

The controller 6 controls the drive source 3a based on the detection value of the detection part 3e so that the rotation angle of the drive source 3a becomes a predetermined rotation angle. That is, the controller 6 controls the rotation angle of the drive source 3a so that the screw axis 3b strokes downward of the caulking device 1 at a predetermined stroke amount. At this time, while the details of the operation of the controller 6 will be described later, the controller 6 determines, based on the caulking depth, the necessary release torque, the stroke amount of the push-in part 4, the stroke amount of the screw axis 3b, and the stroke amount of the push-in part 4 at which the caulk part 9a is damaged, a target control stroke amount of the screw axis 3b, and controls the drive source 3a to achieve the target control stroke amount of the screw axis 3b that has been determined.

The "caulking depth" is an amount of displacement of the stroke direction of the push-in part 4 (that is, vertical direction of the caulking device 1) from a state before the caulk part of the first member to be caulked (nut 9) is caulk-fixed to the second member to be caulked (shaft 8) to a state after the caulk part of the first member to be caulked (nut 9) is caulk-fixed to the second member to be caulked (shaft 8).

For example, as shown in FIG. 4, the "caulking depth" is a difference in height between the caulk part 9a before the caulk part 9a is caulk-fixed (state shown in FIG. 4(a)) and the caulk part 9a after the caulk part 9a is caulk-fixed (state shown in FIG. 4(b)) measured using a measurement gauge having a shape the same as that of the tip end part of the push-in part 4.

More specifically, the "caulking depth" is a value obtained by subtracting the height of the tip end surface of the measurement gauge contacting the caulk part 9a after the caulk part 9a is caulk-fixed from the height of the tip end surface of the measurement gauge contacting the caulk part 9a before the caulk part 9a is caulk-fixed (position in the vertical direction of the caulking device 1).

The "necessary release torque" is torque required to release the state in which the caulk part of the first member to be caulked is caulk-fixed to the second member to be caulked. In this embodiment, the "necessary release torque" is torque required to raise the caulk part 9a that has been folded so that the nut 9 can be rotated around the shaft 8.

The "stroke amount of the push-in part 4" is an amount of displacement that the push-in part 4 is displaced in the vertical direction of the caulking device 1 from the original position. Since the caulk part 9a is somewhat restored after the caulk part 9a is pushed by the push-in part 4, the stroke amount of the push-in part 4 becomes larger than the caulking depth.

The "stroke amount of the screw axis 3b" is an amount of displacement that the screw axis 3b is displaced in the vertical direction of the caulking device 1 from the state in which the push-in part 4 is arranged in the original position. Since the frame part 2 and the like that obtain a counterforce when the push-in part 4 is pushed in are plastically deformed, the stroke amount of the screw axis 3b becomes larger than the stroke amount of the push-in part 4.

The "stroke amount of the push-in part 4 which causes breakage of the caulk part 9a" is a stroke amount of the push-in part 4 at which the caulk part starts to be damaged when it is pushed by the push-in part 4.

The "target control stroke amount of the screw axis 3b" is a stroke amount of the screw axis 3b determined in the controller 6 to satisfy the necessary release torque of the caulk part while preventing damage in the caulk part.

Figure 5:
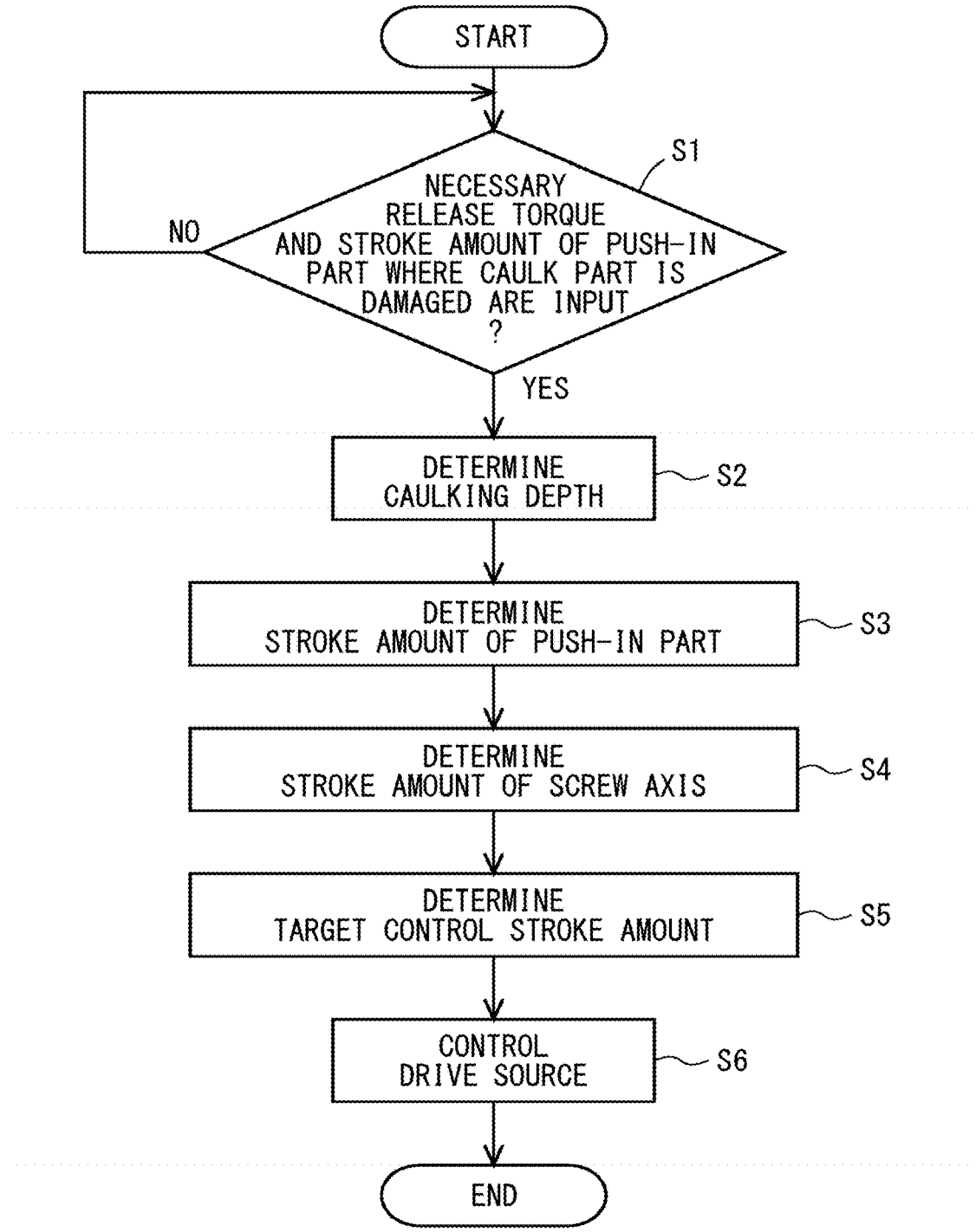
FIG. 5 is a flowchart showing a flow of a caulking method according to the embodiment.
Figure 6:
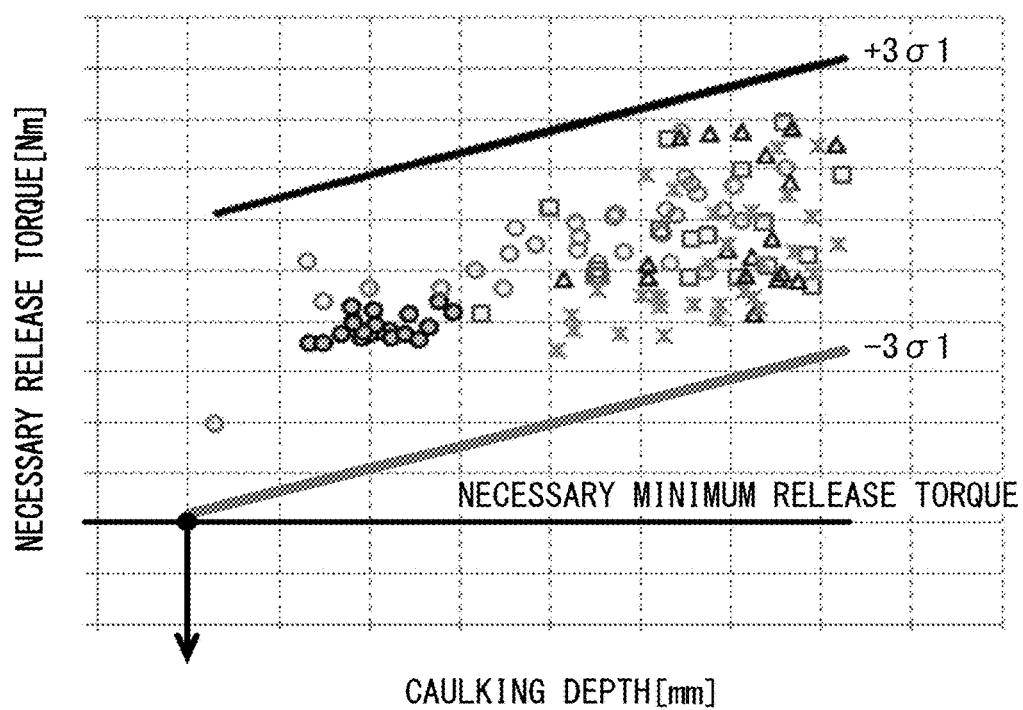
FIG. 6 is a diagram showing a relation between a necessary release torque and a caulking depth.
Figure 7:
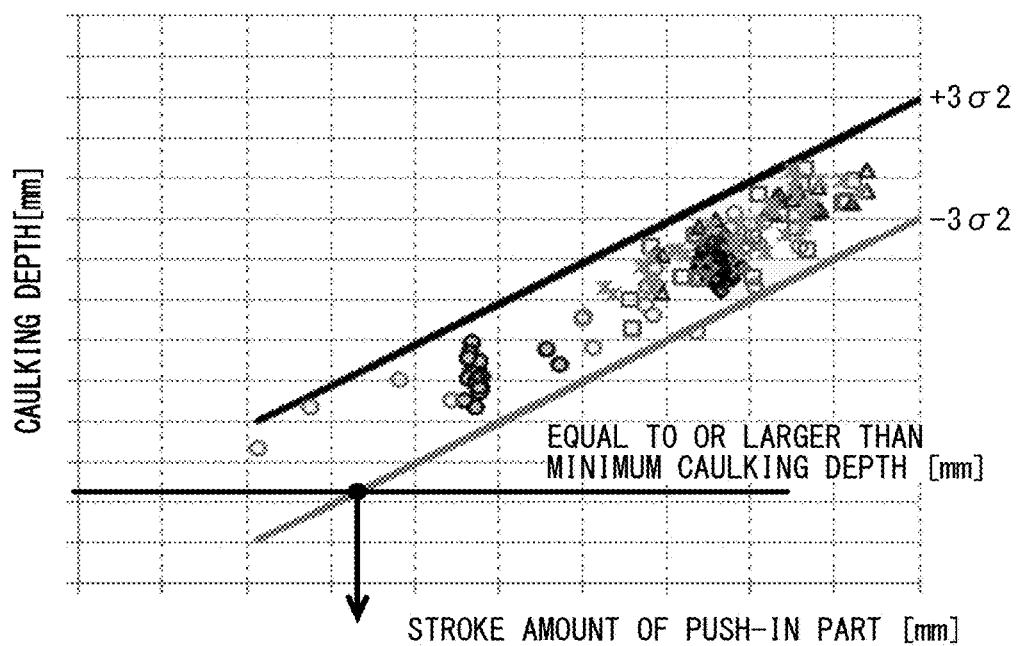
FIG. 7 is a diagram showing a relation between the caulking depth and a stroke amount of a push-in part.
Figure 8:
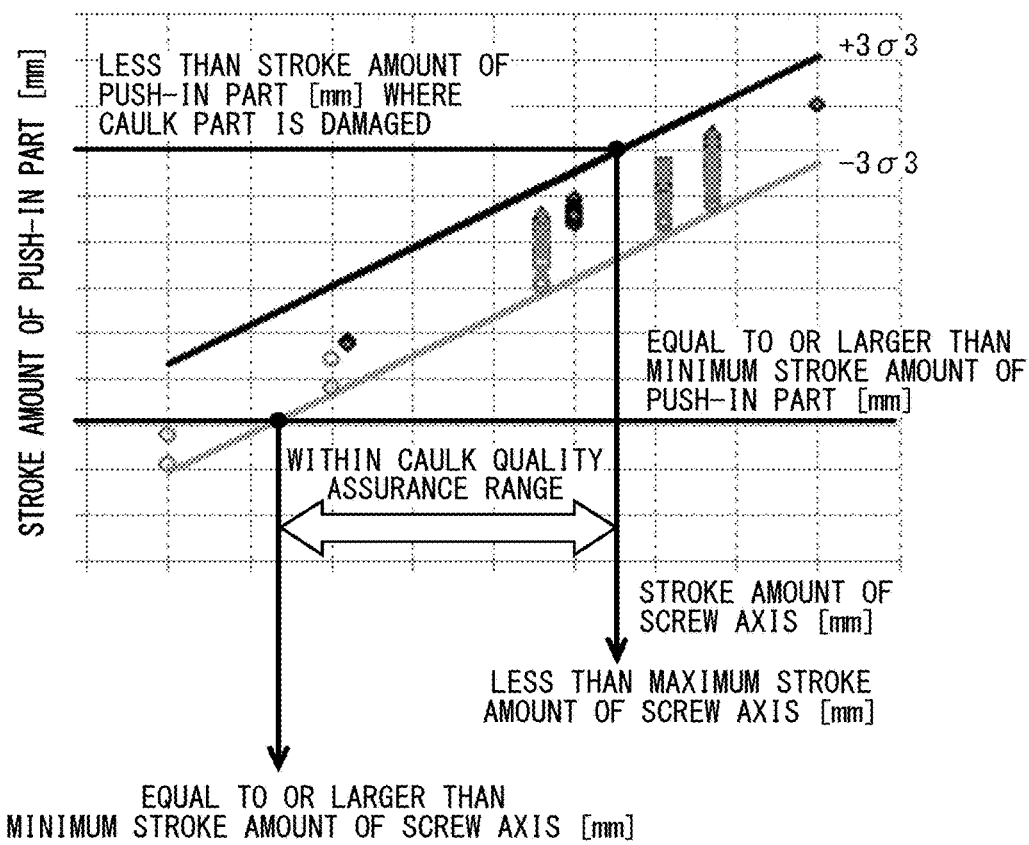
FIG. 8 is a diagram showing a relation among the stroke amount of the push-in part, a stroke amount of a screw axis, and a caulk quality assurance range.

Next, the caulking method according to this embodiment will be described. FIG. 5 is a flowchart showing a flow of the caulking method according to this embodiment. FIG. 6 is a diagram showing a relation between the necessary release torque and the caulking depth. FIG. 7 is a diagram showing a relation between the caulking depth and the stroke amount of the push-in part. FIG. 8 is a diagram showing a relation among the stroke amount of the push-in part, a stroke amount of a screw axis, and a caulk quality assurance range.

First, the controller 6 determines whether the necessary release torque and the stroke amount of the push-in part 4 which causes breakage of the caulk part 9a are input to the caulking device 1 (S1). When the controller 6 determines that the necessary release torque or the stroke amount of the push-in part 4 which causes breakage of the caulk part 9a is not input to the caulking device 1, the process goes back to S1 (NO in S1).

On the other hand, when the controller 6 determines that the necessary release torque and the stroke amount of the push-in part 4 which causes breakage of the caulk part 9a are input to the caulking device 1 (YES in S1), the controller 6 determines the caulking depth which becomes equal to or larger than the necessary release torque based on the relation between the predetermined necessary release torque and the caulking depth as shown in FIG. 6 (S2).

In FIG. 6, $\sigma 1$ denotes a standard deviation in a relation between the necessary release torque and the caulking depth, $-3\sigma 1$ denotes a lower-limit value of the standard deviation in the relation between the necessary release torque and the caulking depth, and $+3\sigma 1$ denotes an upper-limit value of the standard deviation in the relation between the necessary release torque and the caulking depth. In this embodiment, the caulking depth is determined based on $-3\sigma 1$, which is the lower-limit value, so that the necessary release torque that is input becomes the necessary minimum release torque.

Next, the controller 6 determines the stroke amount of the push-in part 4 which becomes equal to or larger than the caulking depth that has been determined based on the relation between the predetermined caulking depth and the stroke amount of the push-in part 4 as shown in FIG. 7 (S3).

In FIG. 7, $\sigma 2$ is a standard deviation in a relation between the caulking depth and the stroke amount of the push-in part 4, $-3\sigma 2$ is a lower-limit value of the standard deviation in the relation between the caulking depth and the stroke amount of the push-in part 4, and $+3\sigma 2$ is an upper-limit value of the standard deviation in the relation between the caulking depth and the stroke amount of the push-in part 4. In this embodiment, the stroke amount of the push-in part 4 is determined based on $-3\sigma 2$, which is the lower-limit value, so that the caulking depth that has been determined becomes equal to the minimum caulking depth.

Next, the controller 6 determines the stroke amount of the screw axis 3b which becomes equal to or larger than the stroke amount of the push-in part 4 that has been determined based on the relation between the stroke amount of the push-in part 4 that has been determined in advance and the stroke amount of the screw axis 3b as shown in FIG. 8 (S4).

In FIG. 8, $\sigma 3$ denotes a standard deviation in a relation between the stroke amount of the push-in part 4 and the stroke amount of the screw axis 3b, $-3\sigma 3$ denotes a lower-limit value of the standard deviation in the relation between the stroke amount of the push-in part 4 and the stroke amount of the screw axis 3b, and $+3\sigma 3$ denotes an upper-limit value of the standard deviation in the relation between the stroke amount of the push-in part 4 and the stroke amount of the screw axis 3b. In this embodiment, the stroke amount of the screw axis 3b is determined based on $-3\sigma 3$, which is the lower-limit value, so that the stroke amount of the push-in part 4 that has been determined becomes the minimum stroke amount of the push-in part 4.

Next, the controller 6 determines the target control stroke amount which is equal to or larger than the stroke amount of the screw axis 3b that has been determined but is smaller than the stroke amount of the screw axis 3b which causes breakage of the caulk part 9a (S5). Therefore, the target control stroke amount is within the caulk quality assurance range that satisfies the necessary release torque of the caulk part 9a while preventing damage in the caulk part 9a.

In this embodiment, the stroke amount of the screw axis 3b which causes breakage of the caulk part 9a is determined based on $+3\sigma 3$, which is the upper-limit value so that the predetermined stroke amount of the push-in part 4 which causes breakage of the caulk part 9a becomes equal to the maximum stroke amount of the push-in part 4. Since the stroke amount of the screw axis 3b which causes breakage of the caulk part 9a can be obtained based on the predetermined stroke amount of the push-in part 4 which causes breakage of the caulk part 9a, it can be considered that the stroke amount of the screw axis 3b which causes breakage of the caulk part 9a is predetermined as well.

Next, the controller 6 controls the drive source 3a while detecting the rotation angle of the output shaft by the detection part 3e so that the screw axis 3b achieves the target control stroke amount (S6). Accordingly, the caulk part 9a is pushed and folded by the push-in part 4 and the nut 9 is caulk-fixed to the shaft 8.

As stated above, in this embodiment, when the drive source 3a is controlled while detecting the rotation angle of the output shaft by the detection part 3e to achieve the target control stroke amount of the screw axis 3b, the caulk part 9a can be caulk-fixed to the shaft 8 to satisfy the necessary release torque of the caulk part 9a while preventing damage in the caulk part 9a. Therefore, there is no need to measure the stroke amount of the push-in part 4 unlike typical caulking devices and the caulk part 9a can be caulk-fixed to the shaft 8 with a simple configuration for a low cost. Further, since the typical servo motor includes the detection part that detects the rotation angle of the output shaft such as an encoder, there is no need to prepare an additional detection part.

Further, in this embodiment, there is no need to perform feedback control when the drive source 3a is controlled, whereby it is possible to reduce the processing load of the controller 6 and to reduce the processing time. It is therefore possible to reduce the working hours needed to caulk-fix the caulk part 9a to the shaft 8.

Now, the upper-limit value and the lower-limit value of the standard deviation stated above can be set as appropriate according to the thickness and the height of the caulk part 9a. For example, the upper-limit value may be set when the thickness of the caulk part 9a is the largest one and the height of the caulk part 9a is the lowest one and the lower-limit value may be set when the thickness of the caulk part 9a is the smallest one and the height of the caulk part 9a is the highest one.

The present invention is not limited to the above embodiments and may be changed as appropriate without departing from the spirit of the present invention.

While the present invention has been described as a hardware configuration in the above embodiments, the present invention is not limited to being a hardware configuration. The present invention may achieve desired processing by causing a central processing unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A caulking method that strokes a push-in part by a drive unit of a caulking device to caulk-fix a caulk part of a first member to be caulked to a second member to be caulked, the method comprising the processes of:

determining, when torque necessary for releasing a state in which the caulk part is caulk-fixed to the second member to be caulked is denoted by a necessary release torque and an amount of displacement in a stroke direction of the push-in part in the caulk part from a state before the caulk part is caulk-fixed to the second member to be caulked to a state after the caulk part is caulk-fixed to the second member to be caulked is denoted by a caulking depth, the caulking depth which becomes equal to or larger than the necessary release torque that has been set in advance based on a relation between the necessary release torque that has been set in advance and the caulking depth, determining a stroke amount of the push-in part which becomes equal to or larger than the caulking depth that has been determined based on a relation between the caulking depth that has been set in advance and the stroke amount of the push-in part;

determining a stroke amount of the drive unit which becomes equal to or larger than the stroke amount of the push-in part that has been determined based on the relation between the stroke amount of the push-in part that has been set in advance and the stroke amount of the drive unit; and controlling the drive unit at a target control stroke amount that is equal to or larger than the stroke amount of the drive unit that has been determined but is smaller than the stroke amount of the drive unit that has been set in advance at which the caulk part is damaged.

* * * * *